United States Patent
Lee et al.

(10) Patent No.: US 11,676,018 B2
(45) Date of Patent: Jun. 13, 2023

(54) FEATURE EXTRACTION WITH KEYPOINT RESAMPLING AND FUSION (KRF)

(71) Applicant: MEDIATEK INC., Hsinchu (TW)

(72) Inventors: Chia-Da Lee, Hsinchu (TW); Wai Mun Wong, Malaysia (TW); Pei-Kuei Tsung, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 316 days.

(21) Appl. No.: 17/162,246

(22) Filed: Jan. 29, 2021

(65) Prior Publication Data
US 2021/0241022 A1 Aug. 5, 2021

Related U.S. Application Data

(60) Provisional application No. 62/967,644, filed on Jan. 30, 2020.

(51) Int. Cl.
| | |
|---|---|
| *G06N 20/00* | (2019.01) |
| *G06N 3/08* | (2023.01) |
| *G06T 3/40* | (2006.01) |
| *G06V 10/764* | (2022.01) |
| *G06V 10/82* | (2022.01) |
| *G06V 10/50* | (2022.01) |

(52) U.S. Cl.
CPC ............. *G06N 3/08* (2013.01); *G06N 20/00* (2019.01); *G06T 3/40* (2013.01); *G06V 10/50* (2022.01); *G06V 10/764* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2017/0140245 A1* | 5/2017 | Kraft | G06F 18/214 |
| 2019/0220696 A1* | 7/2019 | Kraft | G06V 20/13 |
| 2020/0050904 A1* | 2/2020 | Powers | G06F 18/22 |

FOREIGN PATENT DOCUMENTS

| | | |
|---|---|---|
| CN | 106991388 A | 7/2017 |
| TW | M 566860 U | 9/2018 |

\* cited by examiner

*Primary Examiner* — Dov Popovici
(74) *Attorney, Agent, or Firm* — Oblon, McClelland, Maier & Neustadt, L.L.P.

(57) ABSTRACT

A method of feature extraction from an image can include receiving the image including pixels, generating confidence values corresponding to positions of the pixels in the image by an artificial intelligence (AI) based feature extractor, selecting a first position among the positions of the pixels in the image, a first confidence value among the generated confidence values at the first position being higher than a first threshold, and generating a final set of keypoint-descriptor pairs based on the confidence values corresponding to positions of the pixels in the image. The final set of keypoint-descriptor pairs includes at least two keypoint-descriptor pairs corresponding to the first position among the positions of the pixels in the image.

20 Claims, 7 Drawing Sheets

FEATURE EXTRACTION WITH KEYPOINT RESAMPLING AND FUSION (KRF)

INCORPORATION BY REFERENCE

This present application claims the benefit of U.S. Provisional Application No. 62/967,644, "AI Feature Extraction Engine" filed on Jan. 30, 2020, which is incorporated herein by reference in its entirety.

TECHNICAL FIELD

The present disclosure relates to feature extraction in computer vision.

BACKGROUND

In a feature extraction process, interest points and the corresponding local descriptors are generated from an input image. The point correspondences can be used to estimate the pose of a moving camera in various applications such as vision odometry (VO), structure from motion (SfM), and visual-based simultaneous localization and mapping (V-SLAM).

SUMMARY

Aspects of the disclosure provide a method of feature extraction from an image. The method can include receiving the image including pixels, generating confidence values corresponding to positions of the pixels in the image by an artificial intelligence (AI) based feature extractor, selecting a first position among the positions of the pixels in the image, a first confidence value among the generated confidence values at the first position being higher than a first threshold, and generating a final set of keypoint-descriptor pairs based on the confidence values corresponding to positions of the pixels in the image. The final set of keypoint-descriptor pairs includes at least two keypoint-descriptor pairs corresponding to the first position among the positions of the pixels in the image.

In an embodiment, a first set of positions can be selected from the positions of the pixels in the image to be a first set of keypoints based on the generated confidence values. Each of the first set of the positions can correspond to one of the generated confidence values that is above a second threshold. A second set of positions can be selected from the positions of the pixels in the image to be a second set of keypoints based on the generated confidence values. Each of the second set of positions can correspond to one of the generated confidence values that is above the first threshold, the first set of positions including the second set of positions. The selecting of the second set of positions from the positions of the pixels in the image includes the selecting of the first position among the positions of the pixels in the image. The final set of keypoint-descriptors includes a first set of keypoint-descriptor pairs corresponding to members of the first set of the keypoints and a second set of keypoint-descriptor pairs corresponding to members of the second set of the keypoints.

In an embodiment, a first set of positions can be selected from the positions of the pixels in the image to be a first set of keypoints based on the generated confidence values. Each of the first set of the positions can correspond to one of the generated confidence values that is above a second threshold. A second set of positions can be selected from the first set of positions in the image to be a second set of keypoints based on the generated confidence values. Each of the second set of positions can correspond to one of the generated confidence values that is above the first threshold. The selecting the second set of positions from the first set of positions in the image includes the selecting of the first position among the positions of the pixels in the image. The final set of keypoint-descriptors includes a first set of keypoint-descriptor pairs corresponding to members of the first set of the keypoints and a second set of keypoint-descriptor pairs corresponding to members of the second set of the keypoints.

An embodiment of the method can further include determining whether the first confidence value among the generated confidence values at the first position is higher than the first threshold, and in response to the first confidence value among the generated confidence values at the first position being higher than the first threshold, selecting a first keypoint descriptor from the first position in a first descriptor map including keypoint descriptors corresponding to the positions of the pixels in the image, and selecting a second keypoint descriptor from the first position in a second descriptor map including keypoint descriptors corresponding to the positions of the pixels in the image. The at least two keypoint-descriptor pairs include two keypoint-descriptor pairs corresponding to the first keypoint descriptor and the second keypoint descriptor.

An embodiment of the method can further include generating a first descriptor map by the AI based feature extractor, and generating a second descriptor map. The at least two keypoint-descriptor pairs includes two keypoint-descriptor pairs corresponding to a first keypoint descriptor in the first descriptor map and a second keypoint descriptor in the second descriptor map. In an example, the first keypoint descriptor in the first descriptor map is a first binary vector, and the second keypoint descriptor in the second descriptor map is a second binary vector complementary to the first binary vector, where 1 or 0 in the first binary vector is switched to 0 and 1, respectively, in the second binary vector.

An embodiment of the disclosure can further include resizing the image to generate a resized image, determining keypoint-descriptor pairs corresponding to the resized image, and including the keypoint-descriptor pairs corresponding to the resized image in the final set of keypoint-descriptor pairs.

Aspects of the disclosure can provide an apparatus of feature extraction from an image. The apparatus can include circuitry configured to receive the image including pixels, generate confidence values corresponding to positions of the pixels in the image by an AI based feature extractor, select a first position among the positions of the pixels in the image, a first confidence value among the generated confidence values at the first position being higher than a first threshold, and generate a final set of keypoint-descriptor pairs based on the confidence values corresponding to positions of the pixels in the image. The final set of keypoint-descriptor pairs includes at least two keypoint-descriptor pairs corresponding to the first position among the positions of the pixels in the image.

Aspects of the disclosure can further provide a non-transitory computer-readable medium. The medium can store instructions that, when executed by a processor, cause the processor to perform the method of feature extraction from the image.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

I. Limitations of AI-based Feature Extraction

Figure 1:
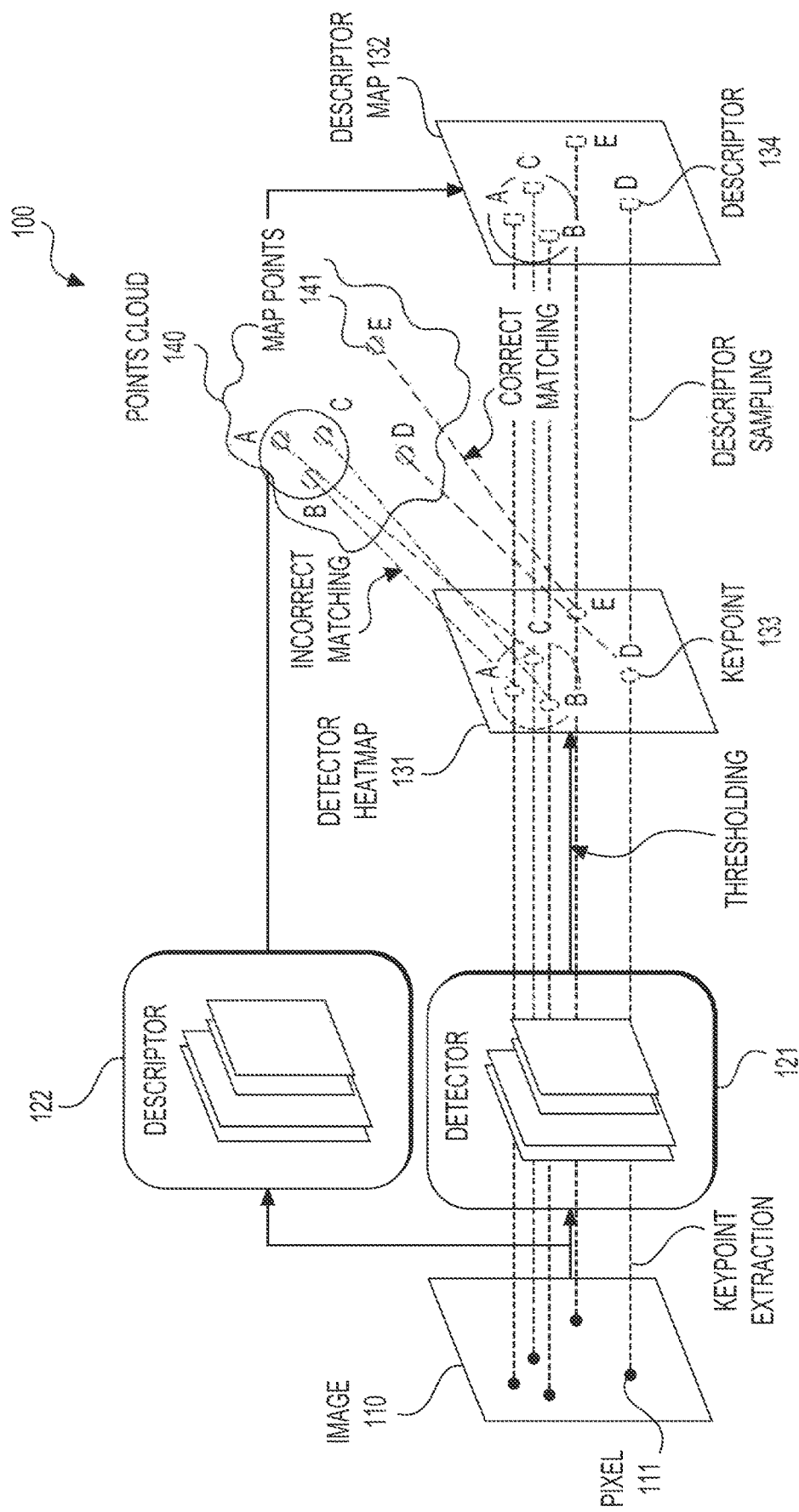
FIG. 1 shows an example of an artificial intelligence (AI) based feature extraction process 100.

In various applications, feature extraction (FE) can be performed to generate interest points and the corresponding local descriptors from an input image. Interest point correspondences between consecutive images can be used to estimate the pose of a moving camera to solve the problems of visual odometry (VO), structure from motion (SfM), visual-based simultaneous localization and mapping (V-SLAM), or the like.

For example, a robot relies on information from the camera to estimate its pose and accordingly tracking its location. A detection engine (or referred to as a feature detector) can detect interest points from feature distinctions such as edges, blobs, and corners in the input image. A description engine can describe each interest point using a representation such as a 256-bit long binary vector. Detected features (keypoint-descriptor pairs) from successive images can be matched based on some similarity metric between their descriptors to establish the point correspondences. Interest points, feature points, and keypoints are used interchangeably in this disclosure.

In some examples, feature extractors, which perform the feature detection and feature description functions, can be categorized as traditional feature extractors and learned (artificial intelligence (AI) based) feature extractors.

Traditional feature extractors compute a corner/edge detection using handcrafted techniques. A detection is typically done by computing the contrast between a center pixel to its neighbors, while its descriptor is usually generated by computing the gradient of pixels within its local patch. Examples of the handcrafted techniques include ORB, rotated FAST, SIFT, rotated BRIEF, and ORB-SLAM2 which are described by the following references respectively: (i) E. Rublee, V. Rabaud, K. Konolige, and G. R. Bradski, "ORB: an efficient alternative to SIFT or SURF," ICCV, Spain, pp. 2564-2571, 2011; (ii) E. Rosten and T. Drummond, "Machine learning for high-speed corner detection," ECCV, Austria, pp. 430-443, 2006; (iii) D. G. Lowe, "Distinctive image features from scale-invariant keypoints," International Journal of Computer Vision, 60(2):91-110, 2004; (iv) M. Calonder, V. Lepetit, C. Strecha, and P. Fua, "BRIEF: Binary Robust Independent Elementary Features," ECCV Greece, pp. 778-792, 2010; and (v) R. Mur-Artal, J. M. M. Montiel, and J. D. Tardos, "ORB-SLAM: a versatile and accurate monocular slam system," IEEE Transactions on Robotics, 31(5):1147-1163, 2015. These references are incorporated by reference herein in their entirety. In some examples, traditional feature extraction is computed by a central processing unit (CPU).

An AI-based feature extractor can learn interest points and descriptors through an end-to-end trained framework. For example, as output of the AI-based feature extractor, a heatmap containing extracted interest points can be generated. Each interest point in the heatmap can be associated with a confidence value or a confidence score (e.g., a number between 0 and 1, or a number within a range broader than the range from 0 to 1). The interest points in the heatmap can be extracted by thresholding against a cut-off confidence threshold. However, this binary style approach ignores the confidence information from each interest point and limits the pose estimation accuracy.

Examples of AI-based feature extraction techniques include SuperPoint (2018), GCNv2 (2019), UnsuperPoint (2019), and ContextDesc (2019) which are described by the following references respectively: (i) D. DeTone, T. Malisiewicz, A. Rabinovich, "SuperPoint: self-supervised interest point detection and description," CVPRW, US, 2017; (ii) J. Tang, L. Ericson, J. Folkesson, and P. Jensfelt "GCNv2: efficient correspondence prediction for real-time SLAM," IEEE Robotics and Automation Letters, 2019; (iii) P. H. Christiansen, M. F. Kragh, Y. Brodskiy, and H. Karstoft, "UnsuperPoint: end-to-end unsupervised interest point detector and descriptor," arXiv preprint arXiv:1907.04011, 2019; and (iv) Zixin Luo, Tianwei Shen, Lei Zhou, Jiahui Zhang, Yao Yao, Shiwei Li, Tian Fang, and Long Quan, "Contextdesc: local descriptor augmentation with cross-modality context" Computer Vision and Pattern Recognition (CVPR), 2019. These references are incorporated by reference herein in their entirety. In some examples, AI-based feature extraction can be computed by a CPU, a graphic processing unit (GPU), an accelerated processing unit (APU), or a combination thereof.

While being more effective than traditional feature extractions, state-of-the-art AI-based feature extraction has the following limitations: non-discriminative to learned interest points with discriminative confidence values due to binary thresholding, and spatially agonistic due to nearby descriptors having high-similarity scores.

FIG. 1 shows an example of an AI-based feature extraction process 100. In the process 100, a binary thresholding approach is employed, and incorrect feature matching takes place due to high descriptor resemblance among dense keypoints. In the process 100, an image 110 including pixels 111 is input to an AI-based detector 121 and an AI-based descriptor 122.

The AI-based detector 121 performs keypoint detection to generate a detector heatmap 131 (also referred to as a detection heatmap or a heatmap). The detector heatmap 131 includes confidence values (e.g., scores between 0 and 1) each corresponding to a pixel of the input image 110. By thresholding the confidence values against a threshold (e.g., 0.1), a set of keypoints 133 including keypoints A-E can be extracted from the detector map 131. Each confidence value (corresponding to a pixel in the image 110) in the detector map 131 can indicate how qualified a respective location is to be an interest point. A higher confidence value can indicate a higher probability that the respective position will be a high-quality interest point.

The keypoints A-C are spatially close to each other and thus are referred to as dense interest points, while the keypoints D-E are each far away from any other keypoints and thus are each referred to as a sparse interest point.

The descriptor 122 performs feature description to generate a descriptor map 132. The descriptor map 132 can include descriptors (e.g., 256-bit feature vectors) corresponding to each pixel 111 in the input image 110. Corresponding to the extracted keypoints A-E in the detector heatmap 131, by performing a descriptor sampling, a set of descriptors 134 including descriptors A-E can be sampled from the descriptor map 132. Keypoint-descriptor pairs each including a coordinate of a keypoint and a corresponding descriptor can thus be formed. Due to the property of the AI-based descriptor 122, the descriptors A-C corresponding to the dense keypoints A-C tend to highly resemble each other, while each of the descriptors D-E corresponding to the sparse keypoints D-E tends to differ from the other descriptors in the descriptor map 132.

A point cloud 140 including map points 141 can be generated based on a sequence of images prior to the current image 110, for example, as a result of a V-SLAM process. Among the map points 141, the map points A-E correspond to the same pixels as the keypoints A-E, respectively. A feature matching process can be performed based on, for example, descriptor similarity metric between the keypoints in the current image 110 and keypoints in a prior image to establish respective keypoint correspondences. The correspondences are shown in FIG. 1 between the keypoints A-E and the map points A-E.

Due to the high resemblance of the descriptor scores of the keypoints A-C, confusion occurs in the feature matching process, and the keypoints A, B, and C are incorrectly matched to the map points B, C, and A, respectively, causing incorrect correspondences. In contrast, due to the low resemblance of the descriptor scores of the keypoints D-E, the keypoints D and E are correctly matched to the map points D and E, respectively, resulting in correct correspondences.

As can be seen in the process 100 described above, the keypoint detection is non-discriminative. All points, once qualified by the thresholding, are treated in the same way, and used as valid interest points with the same importance to sample the descriptor map 132, although extracted features with lower confidence scores have a higher tendency of matching failure (incorrect matching). Certain measures such as feature matching, prose optimization, or random sample consensus (RANSAC) can be used to remove outliers (incorrect matchings). However, the ratio of high-quality keypoints to low-quality keypoints determines how successfully or accurately those measures will work.

A large number of keypoints per image can benefit bundle adjustment or pose graph optimization. However, employment of binary thresholding conflicts with such a goal. Conditioning (using a large detection threshold) can filter out reliable/repeatable points, but reduce the number of points per image. Relaxed conditioning (a low detection threshold) causes the ratio of good keypoint-descriptor pairs over total keypoint-descriptor pairs to drop, and creates too many noisy points that tend to result in matching failures.

In addition, the descriptors 134 are spatially-agonistic in the process 100. Ideally, the extracted keypoints being locally dense and globally sparse can optimize a performance of an application, such as a V-SLAM system. However, some processing operations may not be able to handle dense or concentrated points generated from the AI-based feature extraction. For example, the nearby descriptors A-E may conflict with each other during feature matching. To avoid the conflict, in some examples, neighboring keypoints may have to be partially removed to transform dense keypoints to sparse keypoints before sampling the descriptor map 132. Thus, dense feature points generated from the AI-extraction cannot be fully exploited due to this spatially-agonistic nature. Additionally, suppressing the extracted keypoints results in the number of available keypoints being reduced, which can lower the accuracy of the feature matching operation.

It is desirable that an A-based feature extraction method can provide a large number of available keypoints per image while maintaining a high percentage of good points and keeping locally concentrated keypoints among the available keypoints.

Image Scale Pyramid

In some examples, a scale pyramid (or image pyramid) of an input image is established in order to obtain dense keypoints. The scale pyramid may include multiple levels of images with different sizes. An upper level image can be filtered and subsampled from an adjacent lower level image, and thus has a smaller height and width dimensions. A same feature extraction scheme can be applied to each level of the images to obtain keypoint-descriptor pairs. Keypoint positions at each scaled level can be scaled back to the dimensions of the original input image. As a result, multiple keypoints may be located at or near a same pixel of the input image. However, because those nearby keypoints at different levels are each associated with a different receptive field due to the scaling (e.g., an upper level point has a larger receptive field than a lower level point), the descriptors computed from the different receptive fields can be distinct. Dense keypoints with distinct descriptors can thus be obtained.

As an example, the ORB feature extraction method employs a feature scale pyramid to improve performance of real-time applications including object detection and patch-tracking on a smart phone.

II. AI-Based Feature Extraction with Keypoint Resampling and Fusion (KRF)

Keypoint resampling and fusion (KRF) is an A-based feature extraction scheme. In embodiments employing KRF, confidence information from an AI-based feature extraction process is used to improve accuracy of pose optimization. For example, interest points can be resampled from an input image or a detection map based on different confidence thresholds, resulting in pixel-stacked highly-confident interest points. The ratio of high quality interest points to low quality interest points can thus be increased. In some cases, complementary descriptors are used to describe the pixel-stacked interest points. In some cases, KRF can be combined with the scale pyramid scheme, and applied to multiple levels of resized images to further improve tracking accuracy.

When KRF is employed, a higher ratio of correct correspondences to incorrect correspondences can be obtained compared with other AI-based or non-AI-based feature extraction schemes due to additional high-confident keypoints. In addition, locally dense keypoints can also be maintained. Those technology advantages result in improved pose estimation/optimization performance.

Table 1 shows a comparison of different feature extraction schemes regarding samples per pixel.

TABLE 1

| Feature extraction schemes | Samples per pixel |
|---|---|
| Non-AI-based: ORB-SLAM2 (2015) | Maximum of 8 samples per pixel across 8 octaves of the image scale pyramid (e.g., at scale increments of 1.2 per image scale) |
| AI-based: SuperPoint (2018), GCNv2 (2019), ContextDesc (2019). | 1 sample per pixel |
| AI-Based: KRF | Multiple samples per pixel with conditional sampling (Sampling conditions rely on confidence of the respective detection) |

1. Pose Optimization

In an example, given an input image with size H×W, an AI-based feature detector head predicts a heatmap $X \in R^{H \times W}$. Also, a descriptor head predicts a vector map $\mathcal{D} = R^{H \times W \times d_D}$, where $d\mathcal{D}$ is the vector depth for each pixel in $R^{H \times W}$. Interest points x from X are extracted using binary thresholding, based on a confidence threshold $t_c$, while descriptor vectors are sampled from $\mathcal{D}$. Image-to-map registration is performed by matching descriptors of 2D interest points x against three-dimensional (3D) object points, using Perspective-n-Point (PnP) and/or Bundle Adjustment (BA). Pose optimization is therefore a maximum likelihood problem:

$$\{R, t\} = \operatorname*{argmin}_{R,t} \sum_{k \in X} x_k - \pi(R\tilde{x}_k + t) \quad (1)$$

where $\tilde{x}_k$ denotes the 3D correspondence for the 2D point $x_k$, R, t being the rotation and translation in 3D, and $\pi$ being the 3D-2D reprojection function. So, pose optimization accuracy depends on ratio of accurate correspondences over total correspondences X.

2. Keypoint Resampling

In an embodiment, a VGG-style encoder with 2 local heads (decoders) is employed for generating a heatmap X and a descriptor map $\mathcal{D}$. Both heads can be jointly trained using viewpoint-warped image pairs, with the detector head learning from pseudo-labels while the descriptor head learning to associate similar pixels between the warped images. As a result, the heatmap X learns a confidence number, for example, between 0 and 1, for every pixel at $i,j \in R^{H \times W}$.

In an example, a binary thresholding approach is employed to sample keypoints from the heatmap. A keypoint $x_{ij}$ can be extracted if its corresponding confidence is equal or higher than a threshold $t_c$:

$$x_{ij} = \begin{cases} 1 & \text{If } X_{i,j} \geq t_c \\ 0 & \text{otherwise} \end{cases} \quad (2)$$

In an example, the resampling scheme (multiple rounds of thresholding) is employed to generate stacked keypoints. A first thresholding (or a primary thresholding) is performed to sample keypoints $x^{lc}$ from the heatmap using a low confidence threshold $t^{lc}$, while a second thresholding (or a secondary thresholding) is performed to sample keypoints $x^{hc}$ from the heatmap using a high confidence threshold $t^{hc}$:

$$x_{ij} = \begin{cases} \{x_{ij}^{hc}, x_{ij}^{lc}\}, & \text{If } X_{i,j} \geq t^{hc} \\ x_{ij}^{lc}, & \text{If } t^{hc} > X_{i,j} \geq t^{lc} \\ 0, & \text{otherwise} \end{cases} \quad (3)$$

$$x^{hc} \in x^{lc} \in X \quad (4)$$

Accordingly, a high confidence keypoint at pixel (i,j) is extracted twice because it is qualified by both $t^{lc}$ and $t^{hc}$. The resulting extracted keypoints at pixel (i,j) will appear stacked because both points $\{x_{ij}^{hc}, x_{ij}^{lc}\}$ are located at the same pixel. The confidence information is therefore encoded into stacked keypoints, allowing fine-grained pose optimization with improved accuracy.

In an example, after the stacked keypoints are extracted, descriptors corresponding to different levels of the stacked keypoints are not sampled from the same descriptor map $\mathcal{D}$. During pose estimation, keypoints with similar or identical descriptors are likely to form incorrect matches, and thus removed. Under such a configuration, the descriptors used for a pair of stacked keypoints are derived to be distinct from each other.

Various schemes may be employed for deriving a descriptor different from the descriptor in the descriptor map $\mathcal{D}$ for stacked keypoints. In an example, the descriptors are represented as binary vectors. Accordingly, for two keypoints stacked at a pixel, a complementary descriptor corresponding to an original descriptor in the descriptor map $\mathcal{D}$ can be determined by switching 0 to 1 or 1 to zero for each bit in the binary vector.

3. Effects of Stacked Keypoints

Figure 2:
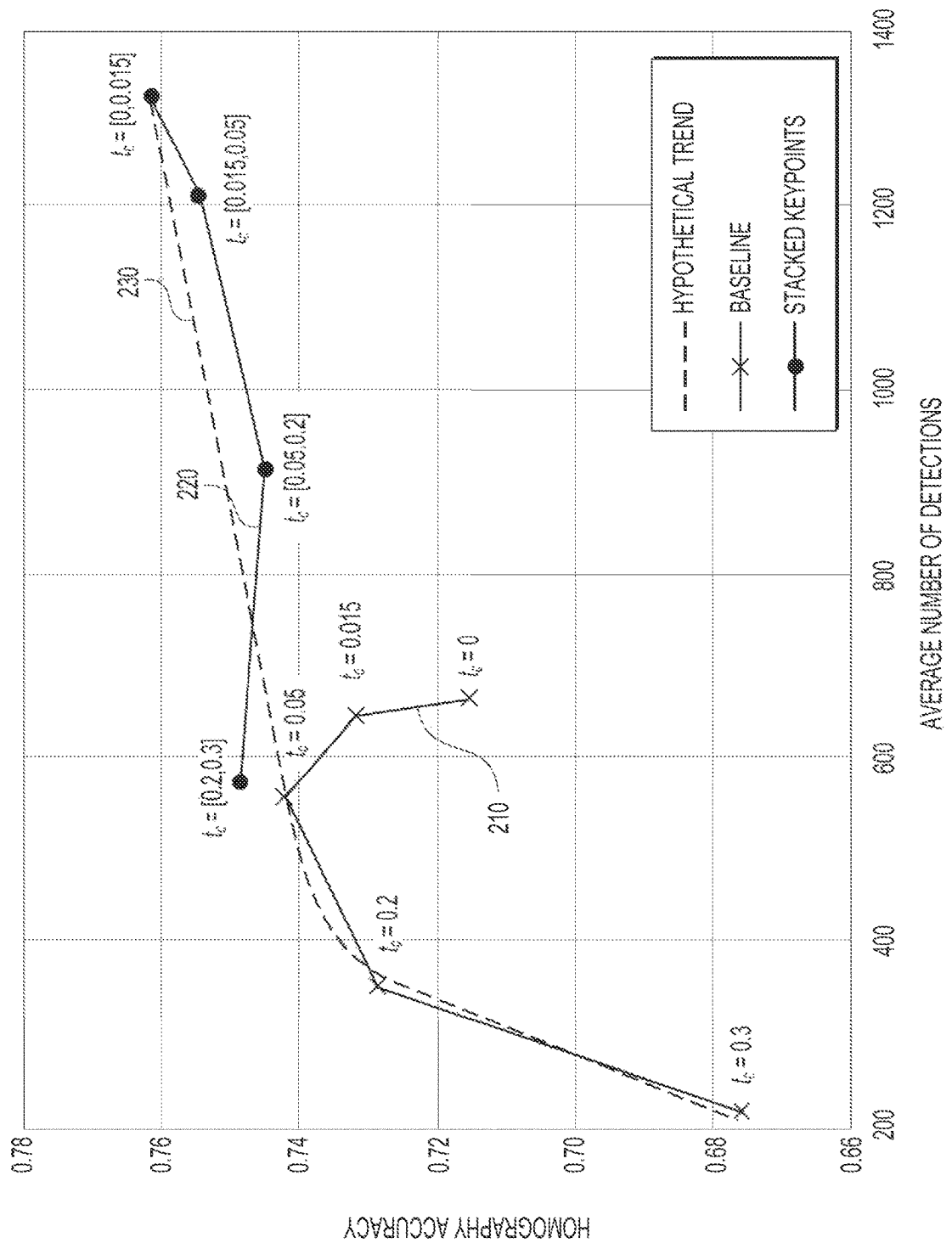
FIG. 2 shows two curves 210 and 220 of homography accuracy (viewpoint-only) versus number of detections (detected interest points)

FIG. 2 shows two curves 210 and 220 of homography accuracy (viewpoint-only) versus number of detections (detected interest points). The curves are obtained based on a homography data set called HPatches. In addition, a third curve 230 showing a hypothetical trend is also shown in FIG. 2.

The curve 210 (base line) corresponds to a first scenario where a binary threshold $t_c$ is employed. For different values of the threshold $t_c$, the homography accuracy (HA) is best when $t_c$=0.05, and worsens when $t_c$ is too small or large. The threshold $t_c$ can be chosen heuristically to allow a sizable number of interest points to be detected. If $t_c$ is too low, low quality (e.g., noisy and low-repeatability) interest points will be picked up. The low quality interest points can be detrimental to pose estimation because non-repeatable points generate incorrect correspondences. In PnP/BA, incorrect correspondences are less harmful when their geometric distances are large, as they can be easily identified as outliers. However, incorrect correspondences can be accepted as inliers and contribute to pose error when the geometric distances are small. On the other side, if $t_c$ is too high then too many points will be suppressed, causing an optimizer (performing PnP/BA) to become sensitive to incorrect correspondences.

The curve 220 (stacked keypoints) corresponds to a second scenario where keypoint resampling is employed. For each data point on the curve 220, a pair of thresholds shown in the brackets is used for two rounds of thresholding operations to generate stacked keypoints. The average number of detections corresponding to each data point is the sum of the keypoints resulting from the two rounds of sampling operations.

As shown, while the pair of the thresholds varies from higher values to lower values, a greater number of keypoints become available. Due to additional high-confidence keypoints in each round of keypoint resampling, the ratio of correct correspondences to incorrect correspondences can be maintained. Accordingly, the HA corresponding to the curve 220 can be maintained or increased. As indicated by the hypothetical line 230, the accuracy of pose estimation will not worsen as long as interest points are extracted without lowering the ratio of accurate correspondences.

Additionally, due to the keypoint resampling scheme, more high-confident keypoints are counted in the resulting keypoint set to increase the bias of the high quality keypoints. Consequently, the HA of the curve 220 is above the HA of the curve 230 for all data points on the curve 220.

4. KRF-based Feature Extraction and Pose Optimization

Figure 3:
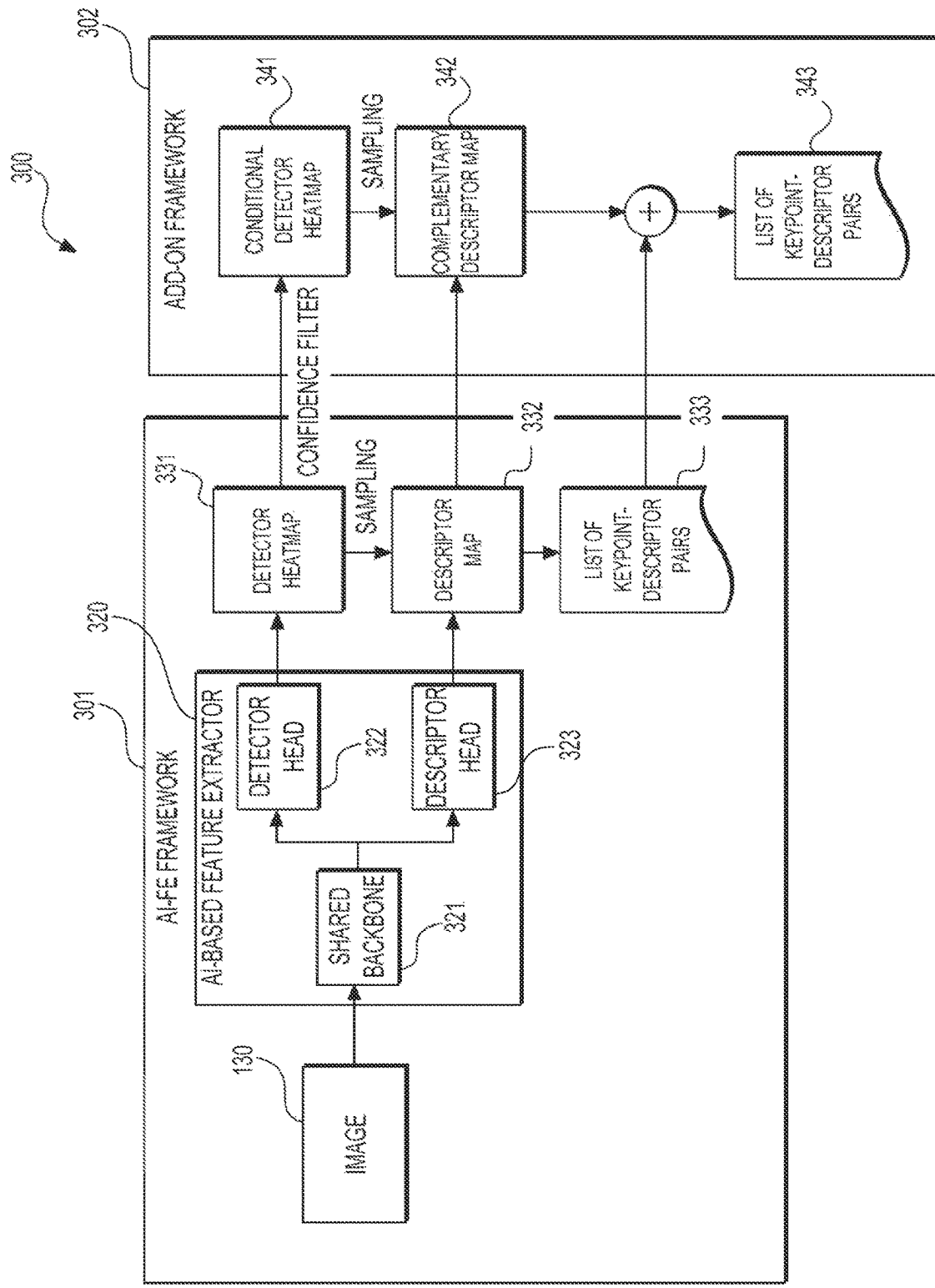
FIG. 3 shows a keypoint resampling and fusion (KRF) based feature extraction system 300 according to embodiments of the disclosure.

FIG. 3 shows a KRF-based feature extraction system 300 according to embodiments of the disclosure. The system 300 can include an AI-based feature extraction framework 301 and an add-on frame work 302. The AI-based feature extraction framework 301 can operate in a way similar to the AI-based feature extraction schemes employing the binary thresholding approach, while the add-on frame work 302 can operate based on resampled keypoints to generate additional keypoint-descriptor pairs associated with stacked high-confident keypoints.

The AI-based feature extraction framework 301 can include an AI-based feature extractor 320. The AI-based feature extractor 320 can be configured to process an input image 310 to output a detector heatmap 331 and a descriptor map 332. The detector heatmap 331 can include confidence values corresponding to each pixel of the input image 130. The detector heatmap 331 can include extracted keypoints each associated with a number (confidence value) indicating a quality of the respective keypoint (e.g., how reliable and/or repeatable the keypoint is), or indicating a probability of the point being a good keypoint. For example, the extracted keypoints can be represented by position coordinates (i,j) in the input image 310. The descriptor map 332 can include a descriptor corresponding to each pixel in the input image 310.

The AI-based feature extractor 320 can use various neural network models and trained in various ways in various embodiments. Typically, the AI-based feature extractor 320 can employ a convolutional neural network (CNN) trained in a supervised, unsupervised, or semi-supervised way. As an example, the AI-based feature extractor 320 can use the SuperPoint architecture as described by D. DeTone, T. Malisiewicz, A. Rabinovich, "SuperPoint: self-supervised interest point detection and description," CVPRW, US, 2017.

In an embodiment, as shown in FIG. 3, the AI-based feature extractor 320 includes a shared backbone (shared encoder) 321, a detector head (detector decoder) 322, and a descriptor head (descriptor decoder) 323. The share backbone 321 process and reduce the input image dimensionality. For example, the shared backbone 321 can use a VGG-style encoder, and includes convolutional layers, spatial down sampling via pooling, and non-linear activation functions. The detector head 322 and the descriptor head 323 learn task specific weights.

In an embodiment, the AI-based feature extractor 320 includes separate pipelines for generating the detector heatmap 331 and the descriptor map 332. For example, two separate neural networks can be employed corresponding to the detector heatmap 331 and the descriptor map 332. Or, one AI-based detector is used for generating the detector heatmap 331, while one non-AI-based descriptor engine is used for generating the descriptor map 332.

The detector heatmap 331 can include a confidence value for each pixel in the input image 310. The confidence values in the detector heatmap, for example, can be output from the detector head 322. Then, a first thresholding (with respect to a later performed second thresholding) can be performed with a first threshold to filter out the extracted keypoints in the detector heatmap 331.

In various embodiments, the confidence values in the detector heatmap 331 can each be a number in a range from 0 to 1 representing a probability of the point being a good keypoint. Or, the confidence values can each be in a range broader than the range from 0 to 1. Corresponding to these two scenarios, the threshold can suitably be defined such that keypoints with a quality above a certain level can be selected.

After the detector heatmap 331 and the descriptor map 332 are available, a descriptor sampling operation can be performed to select descriptors corresponding to the keypoints in the detector heatmap 331 from the descriptor map 332. A first list 333 of keypoint-descriptor pairs can thus be formed by combining the keypoints with the corresponding descriptors. For example, each keypoint-descriptor pair can include a coordinate (i,j) and a descriptor vector.

In operations of the add-on framework 302, in an embodiment, another detector heatmap 341 (referred to as a conditional detector heatmap) can be generated by resampling the detector heatmap 331 (e.g., using a confidence filter). For example, a second thresholding can be performed with a second threshold to filter out the keypoints in the detector heatmap 331 to be included in the conditional detector heatmap 341. The second threshold can correspond to a higher confidence value compared with the first threshold used in the first thresholding for generating the keypoints in the detector heatmap 331.

In an example, the resampling to the detector heatmap 331 is performed by comparing the confidence values of pixels in the detector heatmap 331 with the second threshold. In another example, the resampling to the detector heatmap 331 is performed over the keypoints extracted based on the first threshold. The confidence values of the keypoints extracted based on the first threshold is compared with the second threshold.

In an embodiment, a complementary descriptor map 342 can be generated by the add-on framework 302. For example, by switching 0 to 1 or 1 to 0 for each bit in a descriptor vector in the descriptor map 332, a corresponding complementary vector in the complementary descriptor map 342 can be generated.

In other embodiments, a descriptor map in place of the complementary descriptor map 342 can be generated in various ways to obtain descriptors distinct from the descriptors in the descriptor map 332. In an example, descriptors having a different vector length from that in the descriptor map 332 are used. In an example, descriptors are generated using a descriptor generating scheme (e.g., non-A-based) different from that (e.g., AI-based) used for generating the descriptor map 332. In further embodiments, the descriptor 332 is used in place of the complementary descriptor map 342. Subsequent processing operations for pose estimation or pose optimization can be suitably adjusted to accommodate such a configuration.

After the conditional detector heatmap 341 (containing the keypoints resulting from the resampling) and the complementary descriptor map 342 are available, another descriptor sampling process can be performed to select descriptors corresponding to the keypoints in the conditional detector heatmap 341 from the complementary descriptor map 342. A second list of keypoint-descriptor pairs (not shown) can accordingly be formed by combining the keypoints with the resulting descriptors.

Finally, the add-on framework 302 can perform a fusion operation to combine the first list 333 and the second list of keypoint-descriptor pairs to generate a final list 343 of keypoint-descriptor pairs. The final list 343 of keypoint-descriptor pairs can include keypoint-descriptor pairs of pixel-stacked keypoints with a relative high confidence value above the second threshold. Such a final list 343 leads to a greater number of total keypoints, a higher ratio of high quality keypoints to low quality keypoints (potentially resulting in a higher ratio of correct feature matching correspondences to incorrect feature matching correspondences), and a higher local keypoint density compared with the first list of keypoint-descriptor pairs 333 generated without the keypoint resampling scheme being employed.

While resampling from the detector heatmap 331 is performed once to generate two layers of stacked keypoints in the FIG. 3 example, multiple times of resampling can be performed to generate stacked keypoints of more than two layers in some embodiments. For example, 5 rounds of resampling can be performed over the detector heatmap 331 with 5 different or same confidence thresholds resulting in stacked keypoints of 6 layers. Accordingly, corresponding to each sampling, unique or similar descriptor generation schemes can be employed to generate corresponding descriptor maps. A final list of keypoint-descriptor pairs can include keypoint-pairs generated based on each of the 5 layers of keypoints.

Figure 4:
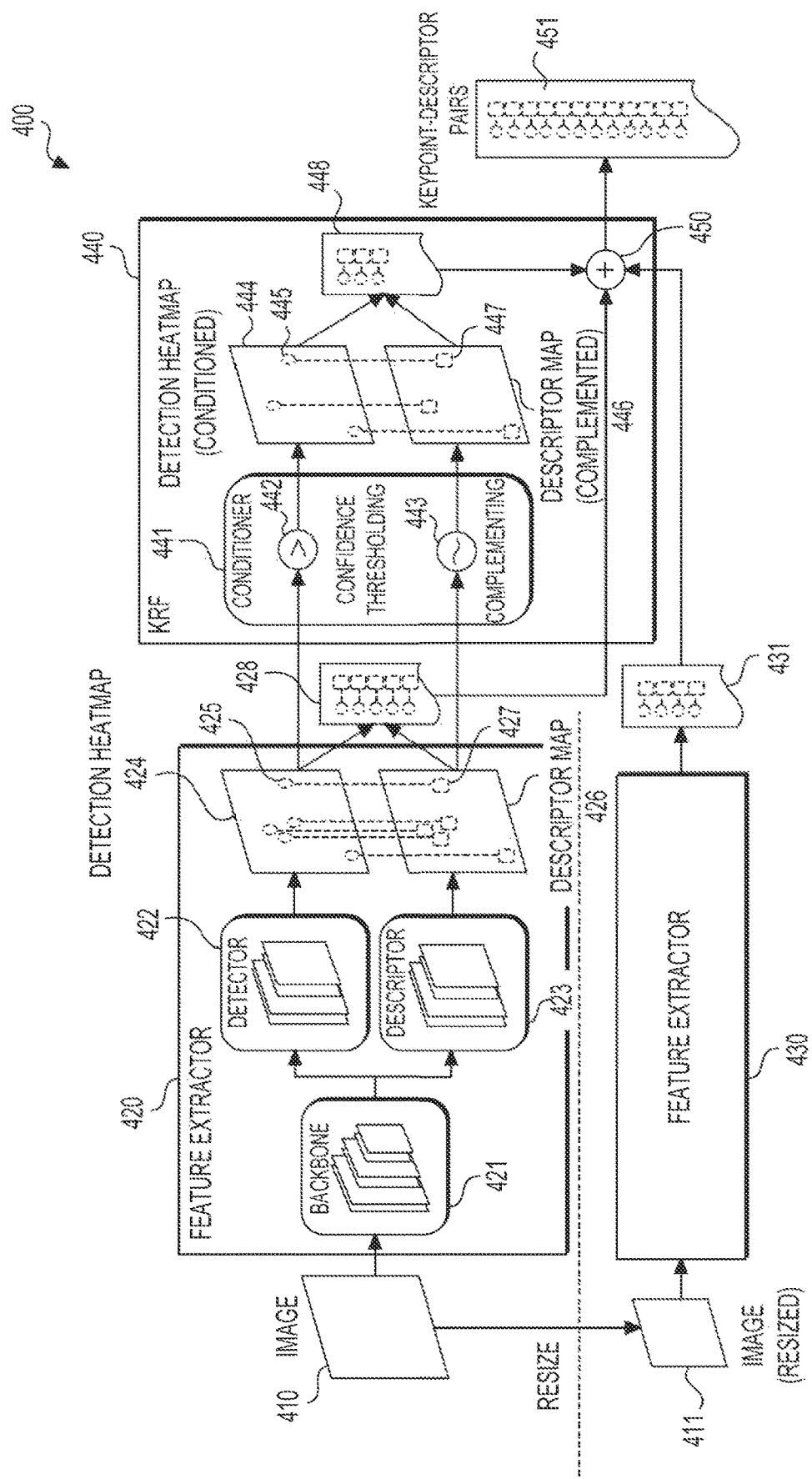
FIG. 4 shows another KRF-based feature extraction system 400 according to embodiments of the disclosure.

FIG. 4 shows another KRF-based feature extraction system 400 according to embodiments of the disclosure. The system 400 can include a first AI-based feature extractor 420, a second AI-based feature extractor 430, and a KRF module 440.

In an embodiment, the first AI-based feature extractor 420 can include a backbone 421 (e.g., a VGG-style encoder) shared by a keypoint detector 422 and a keypoint descriptor 423. The backbone 421 processes an input image 410 to generate a spatially reduced representation of the input image 410. Based on the output of the backbone 421, the keypoint detector 422 generates a detection heatmap 424 (also referred to as a detector heatmap). The detection heatmap 424 includes detected keypoints 425 each associated with a confidence value (or a confidence score) above a first threshold. Based on the output of the backbone 421, the keypoint descriptor 423 can generate a descriptor map 426 including descriptors corresponding to pixels in the input image 410.

Based on the detected keypoints 425, the corresponding descriptors 427 can be sampled from the descriptor map 426. The detected keypoints 425 and the corresponding descriptors 427 can be combined to form a first keypoint-descriptor pair list 428.

In an embodiment, the KRF module 440 includes a conditioner 441. The conditioner 441 can perform a confidence thresholding 442 to the detected keypoints 425 to determine keypoints 445 included in a conditioned detection heatmap 444. The confidence thresholding 442 can be based on a second threshold higher than the first threshold. The conditioned detection heatmap 444 thus includes the keypoints 445 having the confidence value above the second threshold. In addition, the conditioner 441 can perform a complementing operation 443 to generate a complemented descriptor map 446 based on the descriptor map 426. The KRF module 440 can sample the complemented descriptor map 446 based on the keypoints 445 in the conditioned detection heatmap 444 to select corresponding descriptors 447. By combining the keypoints 445 and the corresponding descriptors 447, a second keypoint-descriptor pair list 448 can be generated.

In an embodiment, the second AI-based feature extractor 430 can have a similar structure and perform a similar function as the first AI-based feature extractor 20. However, input to the AI-based feature extractor 430 can be an image 411 that is obtained by resizing (downscaling) the input image 410. In some examples, the resizing can be based on various multi-scale signal representation image processing techniques, such as image pyramid, scale-space representation, multiresolution analysis, and the like. For example, a variety of different smoothing kernels can be used for generating pyramids such as a Gaussian pyramid, a Laplacian pyramid, a steerable pyramid, or the like.

In an example, corresponding to the reduced size of the input image 411, the sizes of neural networks employed in the second AI-based feature extractor 430 can be reduced compared with the first AI-based feature extractor 420. By processing the input image 411, a third keypoint-descriptor pair list 431 can be generated.

The KRF 440 can thus perform a fusion operation 450 to combine the first, second, and third keypoint-descriptor lists 428, 448, and 431 to generate a final list 451 of keypoint-descriptor pairs.

In an embodiment, the KRF module 440 can include another conditioner (similar to the conditioner 441) to process outputs from the second AI-based feature extractor 430 to generate a fourth list of keypoint-descriptor pairs. The fourth list can also be included in the final list 451 to further increase the number of keypoint-descriptor pairs.

In other embodiments, one or more additional AI-based feature extractors similar to the first and second feature extractors 420 and 430 can be added to the system 400 in parallel to the feature extractors 420 and 430. Additional resized images can be generated using the multi-scale signal representation techniques and input to the respective added feature extractors. In this way, more keypoint-descriptor lists can be generated and included in the final list 451 of the keypoint-descriptor pairs.

It is noted that, while the terms "thresholding" "confidence thresholding", "first thresholding", "second thresholding", or "threshold" are used to describe operations of obtaining keypoints from an output from an AI-based feature extraction process, the disclosure is not limited to operations related with those terms. Any operations other than thresholding operations described herein that select keypoints based on confidence scores associated with locations corresponding to pixels of an input image and result in multi-level pixel-stacked keypoints fall within the spirit of the current disclosure. Any other methods (not limited to thresholding) such as post-processing of the input image, against its channels or frequency spectrum, so long as a detection is extracted from the same pixel continuously, should fall within the scope of this disclosure.

In addition, the operations of confidence thresholding 442 and complementing 443 in the module of the conditioner 441 in the FIG. 4 example are simply selected methods of implementation. Other conditioners or methods different from what is described in the FIG. 4 example can also be employed as far as the keypoints in the conditioned heatmap 444 and the complemented descriptor map 446 can be effectively generated.

Further, in some embodiments, separate heatmaps (e.g., the heatmaps 331, 341, 424, and 444) and resampling from a first heatmap to generate keypoints in a second heatmap may not be used.

For example, after a set of confidence scores (e.g., in form of a heatmap) corresponding to pixels of an input image are available from an AI-based feature extraction process, the confidence scores can be checked one by one against a first threshold. When a confidence score higher than or equal to the first confidence threshold is found, a position corresponding to this confidence score can be determined to be a position where pixel-stacked keypoints is to be extracted. Accordingly, two or more pairs of keypoint-descriptor pairs can be formed corresponding to the position (having a coordinate of (i,j) in the input image). Each of the pairs of the keypoint-descriptors can have different descriptors sampled from different descriptor maps (e.g., complementary descriptor maps).

In a similar manner, multiple locations having pixel-stacked keypoints can be determined. Corresponding pairs of keypoint-descriptors for each of the multiple locations can be formed. Those pairs of keypoint-descriptors can be included in a final list of keypoint-descriptor fairs.

Additionally, while checking a confidence score of a position in the heatmap, if the confidence score is smaller than the first threshold, the confidence score can further be compared with a second threshold. The second threshold can be lower than the first threshold. If the confidence score is higher than or equal to the second threshold, a non-stacked keypoint can be extracted from the position. Subsequently, a keypoint-descriptor pairs at this keypoint can be added to the final list of keypoint-descriptor pairs.

In some embodiments, extraction of stacked keypoints is performed by ranking confidence values in a heatmap. For example, confidence values at different positions in a heatmap can be sorted first. Then, a first amount of positions having the highest confidence values can be selected to be pixel-stacked keypoints. A second amount of positions having the highest confidence values can be selected to be non-pixel-stacked keypoints. Using the ranking scheme, stacked keypoints with more than two layers can also be determined.

The KRF scheme disclosed herein can be combined with a broad spectrum of computer vision related technologies or applications to improve performance. For example, the final list of keypoint-descriptor pairs generated using the KRF technique can be used as input to various algorithms and applications, such as perspective-n-point (PNP), feature/interest point matching, bundle adjustment, graph optimization, image retrieval, iterative closest point (ICP), SLAM, visual odometry, relocalization, loop closure, 3D reconstruction, robotic/drone navigation, autonomous vehicles, augmented reality (AR), virtual reality (VR).

Figure 5:
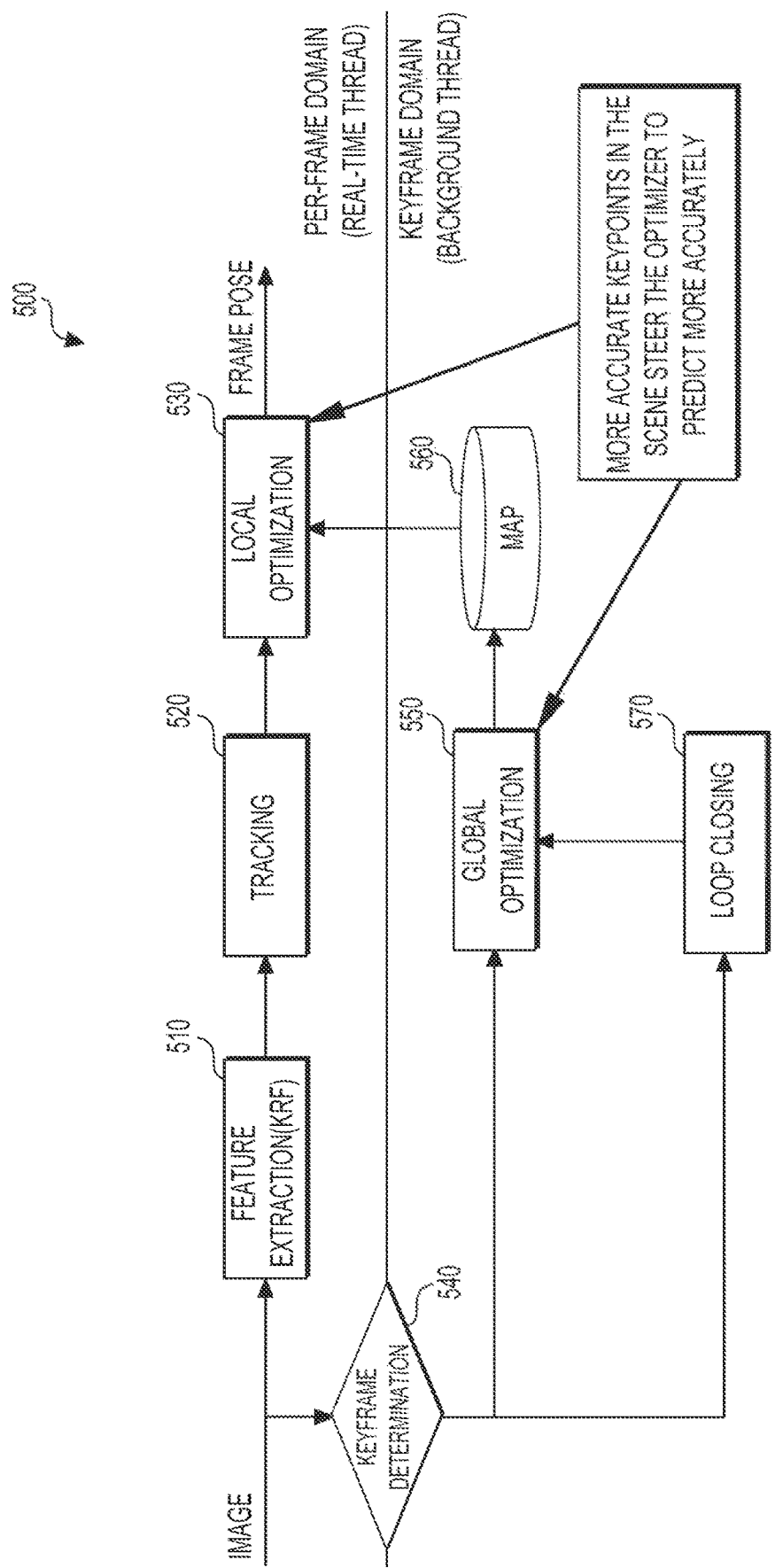
FIG. 5 shows a KRF-based visual simultaneous localization and mapping (V-SlAM) system 500 according to an embodiment of the disclosure.

FIG. 5 shows a KRF-based V-SLAM system 500 according to an embodiment of the disclosure. The system 500 can be configured to track a camera moving in scenes of an environment without a prior map while building a map of the environment based on images output from the camera. The camera can be fixed to a robot or a vehicle that is moving in the environment. The system 500 can include a per-frame domain for a tracking process and a keyframe domain for a mapping process. In an example, the tracking process and the mapping process are separated and run in two parallel threads. The system 500 can include a feature extraction module 510, a tracking module 520, a local optimization module 530, and a keyframe determination module 540 in the per-frame domain, and a global optimization module 550 and a loop closing module 570 in the keyframe domain.

The feature extraction module 510 can be configured to receive image frames output from the camera, and perform AI-based feature extraction frame by frame based on the KRF scheme. Extracted features of each frame in form of a keypoint-descriptor pair list can be input to the tracking module 520.

The tracking module 520 can be configured to perform a pose estimation process to determine a camera pose (e.g., including translation portion and rotation portion) with respect to a 3D map for each frame based on the extracted features in the respective frame. In an example, a feature matching process can be performed to find correspondences between keypoints of a current frame and a preceding frame. Based on the correspondences and the previously built 3D point map (e.g., using triangulation based on extracted keypoints), a transformation (pose update) of the current frame with respect to a preceding frame pose (a pose of a preceding frame) can be determined, for example, using the PnP technique. By concatenating the pose update with the preceding frame pose, a current frame pose can be determined and output from the tracking module 520. In addition, an estimate of a trajectory of the camera can be obtained.

The local optimization module 530 can perform a local optimization process to optimize frame poses received from the tracking module 520 corresponding to frames within a sliding time window. The local optimization process can reduce pose estimation errors accumulated during the pose by pose concatenation process. Various local optimization techniques can be employed. Typically, a local bundle adjustment (BA) optimization technique can be used based on estimated poses and keypoints of recent frames (e.g., 5 frames). As a result, optimized frame poses (based on time order) can be output from the local optimization module 530. In addition, a more accurate estimate of the trajectory of the camera can be determined.

The keyframe determination module 540 can select keyframes based on some criteria. For example, image quality should be good; time since the last keyframe was added should exceed a certain number of frames; and/or the difference between two adjacent keyframes should be above a threshold.

The global optimization module 550 can be configured to perform a global optimization, for example, based on a large number of keyframes. For example, a 3D point map can be initialized and expanded as new keyframes become available. 3D points of keypoints not included in the 3D point map can be added (e.g., by triangulation) when a new keyframe is available. In addition, the 3D point map can include data of all or a subset of selected keyframes (e.g., keypoints and camera pose of each keyframe generated from the modules 510 and 520). After a new keyframe is selected and related data is added to the 3D point map, a global BA can be performed to the 3D point map to output optimized 3D point map (e.g., optimized 3D point positions and camera poses of respective frames). The 3D point map can be stored in a database 560. The 3D point map can be used by the local optimization module 530 to perform the local optimization process in some examples.

The loop closing module 570 can be configured to detect a loop of the path travelled by the camera, and close the loop. In an example, by measuring a similarity between a new keyframe and previously available keyframes, a loop can be detected if two similar keyframes are found. In order to close the look, a pose graph optimization with the loop constraint can be performed to distribute the loop closing error along the respective graph.

The local or global optimization techniques used at the modules 530 or 550 (e.g., local or global BA) in V-SLAM systems typically rely on large number of keypoints (or 3D points) in the scenes to achieve desired optimization performance. More accurate keypoints in the scenes can steer the optimizer to predict more accurately. Accordingly, as the KRF-based feature extractors can add stacked high-confidence keypoints to increase the number of available keypoints as well as the bias of highly-confident points in the scenes, performance of KRF-based V-SLAM can be effectively improved.

III. KRF-based Feature Extraction Process

Figure 6:
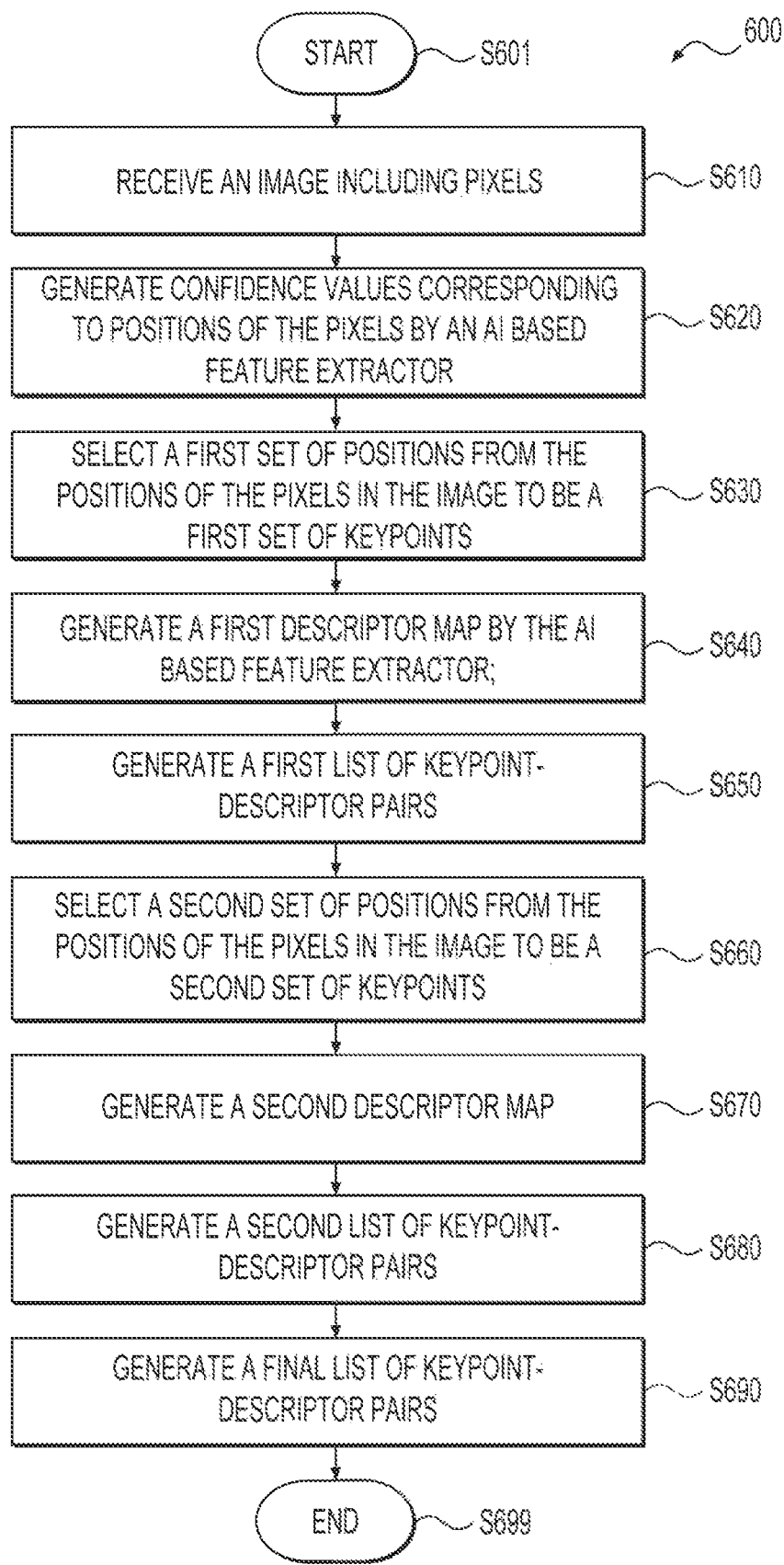
FIG. 6 shows a KRF-based feature extraction process 600 according to an embodiment of the disclosure.

FIG. 6 shows a KRF-based feature extraction process 600 according to an embodiment of the disclosure. It is noted that not all steps in the process 600 are performed in some scenarios, and the steps in the process 600 can be performed in parallel or in an order different from what is shown in FIG. 6. The process 600 can start from S601, and proceed to S610.

At S610, an input image including pixels can be received at an AI-based feature extractor. For example, the image can be output from a camera moving in an environment.

At S620, confidence values corresponding to positions of the pixels in the image can be generated by an AI-based feature detector in the AI-based feature extractor. In an example, the confidence values are in form of a detection heatmap.

At S630, a first set of positions can be selected from the positions of the pixels in the image to be a first set of keypoints based on the generated confidence values in the detection heatmap. For example, a first thresholding can be performed to the confidence values generated at S620 against the first threshold to extract the first set of keypoints. The first set of the positions can each correspond to one of the generated confidence values that is above a first threshold.

At S640, a first keypoint descriptor map can be generated by a feature descriptor engine in the AI-based feature extractor.

At S650, a first list of keypoint-descriptor pairs can be generated. For example, based on the positions of the first set of keypoints, first keypoint descriptors can be selected from the first keypoint descriptor map. The first set of keypoints can be combined with the first keypoint descriptors selected from the first keypoint descriptor map to form the first list of keypoint-descriptor pairs.

At S660, a second set of positions can be selected from the positions of the pixels in the image to be a second set of keypoints based on the generated confidence values. The second set of positions can each correspond to one of the generated confidence values that is above a second threshold. In an example, the second threshold is higher than the first threshold. Thus, the first set of positions includes the second set of positions. In an example, the second set of keypoints is included in a conditioned heatmap.

In an example, the second set of keypoints is selected from the first set of keypoints. For example, a second thresholding can be performed to the confidence values of the first set of keypoints against the second threshold to extract the second set of keypoints. In an example, the second set of keypoints is selected from the positions of the pixels in the input image or the positions in the detection map. For example, a thresholding can be performed to the confidence values at the positions of the pixels in the input image against the second threshold to extract the second set of keypoints.

At S670, a second descriptor map can be generated. In an example, the second descriptor map is generated based on the first descriptor map. For example, each keypoint descriptor in the second descriptor map is a binary vector complementary to a corresponding binary vector in the first descriptor map.

At S680, a second list of keypoint-descriptor pairs can be generated. For example, based on the positions of the second set of keypoints, second keypoint descriptors can be selected from the second keypoint descriptor map. The second set of keypoints can be combined with the second keypoint descriptors selected from the second keypoint descriptor map to form the second list of keypoint-descriptor pairs.

At S690, a final list of keypoint-descriptor pairs can be generated which can include the first and the second lists of keypoint-descriptor pairs. Thereafter, the final list of keypoint-descriptors can be input to, for example, a pose estimation process, a pose optimization process, or a pose graph optimization process. The process 600 can proceed to S699, and terminate at S699.

In an alternative KRF-based feature extraction process, instead of determining the first and second sets of keypoints separately, pixel-stacked keypoints can be determined as follows. For example, the positions of the pixels in the input image can be examined sequentially or in parallel to see if a confidence value at a position is higher than, for example, the second threshold used in the process 600. When a position having a confidence value above the second threshold is detected, it can be determined pixel-stacked keypoints can be employed at this position. Subsequently, two keypoint descriptors can be selected from the first and the second descriptor maps used in the process 600 based on the detected position. Two keypoint-descriptor pairs corresponding to two pixel-stacked keypoints at the detected position can thus be formed and included in the final list of keypoint-descriptor pairs.

In addition, for a position having a confidence value not higher than the second threshold, the respective confidence value can be compared with the first threshold. If the respective confidence value is higher than the first threshold, it can be determined that a single keypoint can be employed for this position. Accordingly, one keypoint-descriptor pair corresponding to this position can be generated and included in the final list of keypoint-descriptor pairs.

IV. Apparatus and Computer-Readable Medium

Figure 7:
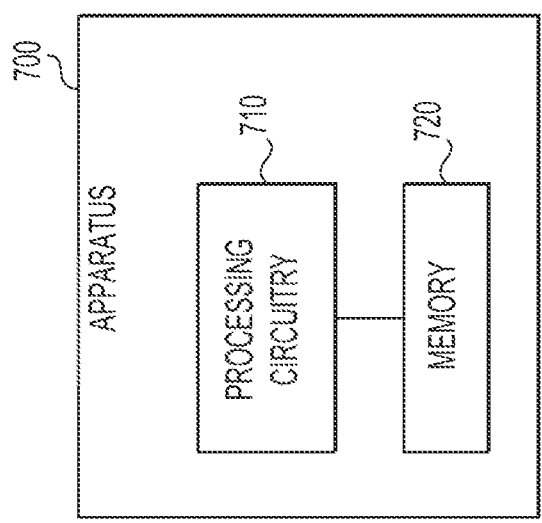
FIG. 7 shows an exemplary apparatus 700 according to embodiments of the disclosure.

FIG. 7 shows an exemplary apparatus 700 according to embodiments of the disclosure. The apparatus 700 can be configured to perform various functions in accordance with one or more embodiments or examples described herein. Thus, the apparatus 700 can provide means for implementation of mechanisms, techniques, processes, functions, components, systems described herein. For example, the apparatus 700 can be used to implement functions of AI-based feature extractors, non-AI-based feature extractors, keypoint detectors, keypoint descriptors, KRF modules, AI-based feature extraction modules, add-on frameworks, modules in a V-SLAM system in various embodiments and examples described herein. The apparatus 700 can include a general purpose processor or specially designed circuits to implement various functions, components, or processes described herein in various embodiments. The apparatus 700 can include processing circuitry 710, and a memory 720.

In various examples, the processing circuitry 710 can include circuitry configured to perform the functions and processes described herein in combination with software or without software. In various examples, the processing circuitry 710 can be a central processing unit (CPU), a graphic process unit (GPU), an accelerated processing unit (APU), a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 710 can be a central processing unit (CPU) or an accelerated processing unit (APU) configured to execute program instructions to perform various functions and processes described herein. Accordingly, the memory 720 can be configured to store program instructions. The processing circuitry 710, when executing the program instructions, can perform the functions and processes. The memory 720 can further store other programs or data, such as operating systems, application programs, and the like. The memory 720 can include non-transitory storage media, such as a read only memory (ROM), a random access memory (RAM), a flash memory, a solid state memory, a hard disk drive, an optical disk drive, and the like.

The apparatus 700 can optionally include other components, such as input and output devices, additional or signal processing circuitry, and the like. Accordingly, the apparatus 700 may be capable of performing other additional functions, such as executing application programs, image processing algorithms, input or output data, or the like.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

V. Experiments

1. Datasets

Experiments of the KRF scheme described herein are carried out using 2 datasets, HPatches and TUM which are benchmarks for homography estimation and SLAM indoor tracking accuracy. The HPatches sequence dataset contains 580 image pairs categorized into 59 viewpoint and 57 illumination scenes. A KRF-based model is evaluated on HPatches HA, which compares the average distance error of four image corners j of the ground-truth warped image $C_j$ against network-estimated warped image $C^*_j$. This distance error is then binary thresholded against a tolerance threshold value, and averaged across all N image pairs.

$$HA = \frac{1}{N}\sum_{i=1}^{N}\left(\left(\frac{1}{4}\sum_{j=1}^{4}\|C_{ij} - C^*_{ij}\|\right) \leq \varepsilon\right) \quad (5)$$

In addition, KRF-based model is also integrated into an ORB-SLAM2 framework in order to evaluate the absolute trajectory error (ATE) on the TUM RGB-D SLAM dataset. This dataset contains RGB image clips ranging from 23 to 173 seconds captured using Microsoft Kinect at a resolution of 480×640 and 30 FPS, with corresponding depth maps and ground truth trajectories.

2. HPatches Results

In Table 2, the HA scores for a tolerance threshold $\varepsilon$ of 1, 3 and 5 is presented. Results obtained from classical FEs, LFnet and UnsuperPoint are reported from P. H. Christiansen, M. F. Kragh, Y. Brodskiy, and H. Karstoft, "UnsuperPoint: End-to-end unsupervised interest point detector and descriptor," arXiv preprint arXiv:1907.04011, 2019. For AI-FE, Non-Maximum Suppression (NMS) is used as they were trained with spatial suppression to preserve keypoint saliency. In addition, NMS improves the HA scores of AI-FEs.

TABLE 2

| | HA, 480 × 640, 1000 points | | |
|---|---|---|---|
| | $\varepsilon = 1$ | $\varepsilon = 3$ | $\varepsilon = 5$ |
| Classical FE | | | |
| $ORB_{NMS=0}$ | 0.286 | 0.607 | 0.710 |
| $SIFT_{NMS=0}$ | 0.602 | 0.833 | 0.876 |
| $SIFT_{NMS=4}$ | 0.576 | 0.807 | 0.855 |
| AI-FE | | | |
| $LFnet(ind.)_{NMS=0}$ | 0.231 | 0.679 | 0.803 |
| $LFnet(outd.)_{NMS=0}$ | 0.400 | 0.745 | 0.834 |
| $UnsuperPoint_{NMS=4}$ | 0.521 | 0.831 | 0.902 |
| $SuperPoint_{NMS=4}$ | 0.419 | 0.819 | 0.912 |
| $SuperPoint_{NMS=4} + KRF_{[0.015,0.100]}$ | 0.455 | 0.836 | 0.913 |
| $SuperPoint_{NMS=8}$ | 0.457 | 0.829 | 0.900 |
| $SuperPoint_{NMS=8} + KRF_{[0.015,0.100]}$ | 0.440 | 0.834 | 0.914 |
| $SuperPoint_{NMS=8} + KRF_{[0.015,0.050]}$ | 0.443 | 0.841 | 0.914 |

The author-released SuperPoint is used as baseline for the KRF model. In the implementation of the KRF model, a confidence threshold of $t_c$=0.015 is used for the vanilla SuperPoint, while a $t^{hc}$=0.05 and 0.1 is used for the KRF resampler, without using a scale pipeline (e.g., the feature extractor 430 in FIG. 4). KRF performs best at larger tolerances $\varepsilon$ of 3 and 5, improving SuperPoint by 12-17%. However, this benchmark does not exhibit the full potential of KRF since only high-quality images are used.

3. SLAM Results

In Table 3, the absolute trajectory error (ATE) comparison between ORB-SLAM2, SuperPoint-SLAM, and Super-Point-KRF-SLAM are presented. To evaluate tracking accuracy, all experiments are run without loop closure, and tracked using the same method as in ORB-SLAM2. Due to motion blur, a low threshold of $t_c$=0.0005 is used for SuperPoint-SLAM, while $t_c$=[0.0005, 0.1005] is used for SuperPoint-KRF-SLAM. This is to allow at least 200 keypoints to be extracted per frame. In table 3, the measurements take the median/average across 10 runs. Experiments where tracking lost has happened for more than 3 runs are indicated as "Track Lost".

TABLE 3

| Dataset | ORB-SLAM2 | SuperPoint-SLAM | SuperPoint SLAM (2 × SP) | SuperPoint-KRF-SLAM (2 × SP) |
|---|---|---|---|---|
| fr1_room | 0.128/0.122 | 0.118/0.124 | 0.092/0.097 | 0.072/0.074 |
| fr1_room_short | 0.104/0.114 | 0.065/0.069 | 0.078/0.075 | 0.073/0.072 |
| fr1_floor | Track Lost | 0.012/0.012 | 0.012/0.012 | 0.012/0.014 |
| fr1_desk | Track Lost | Track Lost | Track Lost | 0.015/0.015 |
| fr1_360 | 0.273/0.264 | Track Lost | Track Lost | Track Lost |
| fr3_long_office | 0.715/0.670 | Track Lost | Track Lost | 0.341/0.342 |
| fr3_large_cabinet | Track Last | Track Lost | 0.079/0.080 | 0.061/0.062 |
| fr3_nstf | 0.048/0.051 | Track Lost | Track Lost | 0.026/0.026 |

SuperPoint performs better than ORB-SLAM2 when the tracked features are robust: room_short contains the first 800 frames from room with robust features, in which Super-Point-SLAM achieved a 0.010 improvement in ATE over ORB-SLAM2. It however performed poorly in the second half of room. For all other scenarios apart from floor, SuperPoint-SLAM suffers from tracking lost.

SuperPoint-KRF-SLAM outperformed both the ORB-SLAM2 and SuperPoint-SLAM, with exception of room_short which is marginally poorer than SuperPoint-SLAM, and 360 which it has also suffered from tracking lost.

SuperPoint-KRF-SLAM is also the only model to complete room without trajectory degradation on the second half, achieving a 40% improvement over SuperPoint-SLAM, with a median ATE of 0.072. It is also able to complete desk and large_cabinet accurately, and on long_office and nstf our model also performed far better than ORB-SLAM2, with SuperPoint-SLAM also suffered from tracking lost.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of feature extraction from an image, comprising:
   receiving the image including pixels;
   generating confidence values corresponding to positions of the pixels in the image by an artificial intelligence based feature extractor;
   selecting a first position among the positions of the pixels in the image, a first confidence value among the generated confidence values at the first position being higher than a first threshold; and
   generating a final set of keypoint-descriptor pairs based on the confidence values corresponding to the positions of the pixels in the image, the final set of keypoint-descriptor pairs including at least two keypoint-descriptor pairs corresponding to the first position among the positions of the pixels in the image.

2. The method of claim 1, further comprising:
   selecting a first set of positions from the positions of the pixels in the image to be a first set of keypoints based on the generated confidence values, each of the first set of the positions corresponding to one of the generated confidence values that is above a second threshold; and
   selecting a second set of positions from the positions of the pixels in the image to be a second set of keypoints based on the generated confidence values, each of the second set of positions corresponding to one of the generated confidence values that is above the first threshold, the first set of positions including the second set of positions,
   wherein
   the selecting the second set of positions from the positions of the pixels in the image includes the selecting of the first position among the positions of the pixels in the image, and
   the final set of keypoint-descriptor pairs includes a first set of keypoint-descriptor pairs corresponding to members of the first set of the keypoints and a second set of keypoint-descriptor pairs corresponding to members of the second set of the keypoints.

3. The method of claim 1, further comprising:
   selecting a first set of positions from the positions of the pixels in the image to be a first set of keypoints based on the generated confidence values, each of the first set of the positions corresponding to one of the generated confidence values that is above a second threshold; and
   selecting a second set of positions from the first set of positions in the image to be a second set of keypoints based on the generated confidence values, each of the second set of positions corresponding to one of the generated confidence values that is above the first threshold,
   wherein
   the selecting the second set of positions from the first set of positions in the image includes the selecting of the first position among the positions of the pixels in the image, and
   the final set of keypoint-descriptor pairs includes a first set of keypoint-descriptor pairs corresponding to members of the first set of the keypoints and a second set of keypoint-descriptor pairs corresponding to members of the second set of the keypoints.

4. The method of claim 1, further comprising:
   determining whether the first confidence value among the generated confidence values at the first position is higher than the first threshold; and
   in response to the first confidence value among the generated confidence values at the first position being higher than the first threshold,
   selecting a first keypoint descriptor from the first position in a first descriptor map including keypoint descriptors corresponding to the positions of the pixels in the image, and
   selecting a second keypoint descriptor from the first position in a second descriptor map including keypoint descriptors corresponding to the positions of the pixels in the image, wherein the at least two keypoint-descriptor pairs include two keypoint-descriptor pairs corresponding to the first keypoint descriptor and the second keypoint descriptor.

5. The method of claim 1, further comprising:
generating a first descriptor map by the artificial intelligence based feature extractor; and
generating a second descriptor map,
wherein the at least two keypoint-descriptor pairs include two keypoint-descriptor pairs corresponding to a first keypoint descriptor in the first descriptor map and a second keypoint descriptor in the second descriptor map.

6. The method of claim 5, wherein the first keypoint descriptor in the first descriptor map is a first binary vector, and the second keypoint descriptor in the second descriptor map is a second binary vector complementary to the first binary vector, where 1 or 0 in the first binary vector is switched to 0 and 1, respectively, in the second binary vector.

7. The method of claim 1, further comprising:
resizing the image to generate a resized image:
determining keypoint-descriptor pairs corresponding to the resized image; and
including the keypoint-descriptor pairs corresponding to the resized image in the final set of keypoint-descriptor pairs.

8. An apparatus of feature extraction from an image, comprising circuitry configured to:
receive the image including pixels;
generate confidence values corresponding to positions of the pixels in the image by an artificial intelligence based feature extractor;
select a first position among the positions of the pixels in the image, a first confidence value among the generated confidence values at the first position being higher than a first threshold; and
generate a final set of keypoint-descriptor pairs based on the confidence values corresponding to the positions of the pixels in the image, the final set of keypoint-descriptor pairs including at least two keypoint-descriptor pairs corresponding to the first position among the positions of the pixels in the image.

9. The apparatus of claim 8, wherein the circuitry is further configured to:
select a first set of positions from the positions of the pixels in the image to be a first set of keypoints based on the generated confidence values, each of the first set of the positions corresponding to one of the generated confidence values that is above a second threshold; and
select a second set of positions from the positions of the pixels in the image to be a second set of keypoints based on the generated confidence values, each of the second set of positions corresponding to one of the generated confidence values that is above the first threshold, the first set of positions including the second set of positions,
wherein
the second set of positions includes the first position among the positions of the pixels in the image, and
the final set of keypoint-descriptor pairs includes a first set of keypoint-descriptor pairs corresponding to members of the first set of the keypoints and a second set of keypoint-descriptor pairs corresponding to members of the second set of the keypoints.

10. The apparatus of claim 8, wherein the circuitry is further configured to:
select a first set of positions from the positions of the pixels in the image to be a first set of keypoints based on the generated confidence values, each of the first set of the positions corresponding to one of the generated confidence values that is above a second threshold; and
select a second set of positions from the first set of positions in the image to be a second set of keypoints based on the generated confidence values, each of the second set of positions corresponding to one of the generated confidence values that is above the first threshold,
wherein
the second set of positions includes the first position among the positions of the pixels in the image, and
the final set of keypoint-descriptor pairs includes a first set of keypoint-descriptor pairs corresponding to members of the first set of the keypoints and a second set of keypoint-descriptor pairs corresponding to members of the second set of the keypoints.

11. The apparatus of claim 8, wherein the circuitry is further configured to:
determine whether the first confidence value among the generated confidence values at the first position is higher than the first threshold; and
in response to the first confidence value among the generated confidence values at the first position being higher than the first threshold, select a first keypoint descriptor from the first position in a first descriptor map including keypoint descriptors corresponding to the positions of the pixels in the image, and select a second keypoint descriptor from the first position in a second descriptor map including keypoint descriptors corresponding to the positions of the pixels in the image,
wherein the at least two keypoint-descriptor pairs include two keypoint-descriptor pairs corresponding to the first keypoint descriptor and the second keypoint descriptor.

12. The apparatus of claim 8, wherein the circuitry is further configured to:
generate a first descriptor map by the artificial intelligence based feature extractor; and
generate a second descriptor map,
wherein the at least two keypoint-descriptor pairs include two keypoint-descriptor pairs corresponding to a first keypoint descriptor in the first descriptor map and a second keypoint descriptor in the second descriptor map.

13. The apparatus of claim 12, wherein the first keypoint descriptor in the first descriptor map is a first binary vector, and the second keypoint descriptor in the second descriptor map is a second binary vector complementary to the first binary vector, where 1 or 0 in the first binary vector is switched to 0 and 1, respectively, in the second binary vector.

14. The apparatus of claim 8, wherein the circuitry is further configured to:
resize the image to generate a resized image;
determine keypoint-descriptor pairs corresponding to the resized image; and
include the keypoint-descriptor pairs corresponding to the resized image in the final set of keypoint-descriptor pairs.

15. A non-transitory computer-readable medium storing instructions that, when executed by a processor, cause the processor to perform a method of feature extraction from an image, the method comprising:

receiving the image including pixels;
generating confidence values corresponding to positions of the pixels in the image by an artificial intelligence based feature extractor;
selecting a first position among the positions of the pixels in the image, a first confidence value among the generated confidence values at the first position being higher than a first threshold; and
generating a final set of keypoint-descriptor pairs based on the confidence values corresponding to the positions of the pixels in the image, the final set of keypoint-descriptor pairs including at least two keypoint-descriptor pairs corresponding to the first position among the positions of the pixels in the image.

16. The non-transitory computer-readable medium of claim 15, wherein the method further comprises:
selecting a first set of positions from the positions of the pixels in the image to be a first set of keypoints based on the generated confidence values, each of the first set of the positions corresponding to one of the generated confidence values that is above a second threshold; and
selecting a second set of positions from the positions of the pixels in the image to be a second set of keypoints based on the generated confidence values, each of the second set of positions corresponding to one of the generated confidence values that is above the first threshold, the first set of positions including the second set of positions,
wherein
the selecting the second set of positions from the positions of the pixels in the image includes the selecting of the first position among the positions of the pixels in the image, and
the final set of keypoint-descriptor pairs includes a first set of keypoint-descriptor pairs corresponding to members of the first set of the keypoints and a second set of keypoint-descriptor pairs corresponding to members of the second set of the keypoints.

17. The non-transitory computer-readable medium of claim 15, wherein the method further comprises:
selecting a first set of positions from the positions of the pixels in the image to be a first set of keypoints based on the generated confidence values, each of the first set of the positions corresponding to one of the generated confidence values that is above a second threshold; and
selecting a second set of positions from the first set of positions in the image to be a second set of keypoints based on the generated confidence values, each of the second set of positions corresponding to one of the generated confidence values that is above the first threshold,
wherein
the selecting the second set of positions from the first set of positions in the image includes the selecting of the first position among the positions of the pixels in the image, and
the final set of keypoint-descriptor pairs includes a first set of keypoint-descriptor pairs corresponding to members of the first set of the keypoints and a second set of keypoint-descriptor pairs corresponding to members of the second set of the keypoints.

18. The non-transitory computer-readable medium of claim 15, wherein the method further comprises:
determining whether the first confidence value among the generated confidence values at the first position is higher than the first threshold; and
in response to the first confidence value among the generated confidence values at the first position being higher than the first threshold,
selecting a first keypoint descriptor from the first position in a first descriptor map including keypoint descriptors corresponding to the positions of the pixels in the image, and
selecting a second keypoint descriptor from the first position in a second descriptor map including keypoint descriptors corresponding to the positions of the pixels in the image,
wherein the at least two keypoint-descriptor pairs include two keypoint-descriptor pairs corresponding to the first keypoint descriptor and the second keypoint descriptor.

19. The non-transitory computer-readable medium of claim 15, wherein the method further comprises:
generating a first descriptor map by the artificial intelligence based feature extractor; and
generating a second descriptor map,
wherein the at least two keypoint-descriptor pairs include two keypoint-descriptor pairs corresponding to a first keypoint descriptor in the first descriptor map and a second keypoint descriptor in the second descriptor map.

20. The non-transitory computer-readable medium of claim 19, wherein the first keypoint descriptor in the first descriptor map is a first binary vector, and the second keypoint descriptor in the second descriptor map is a second binary vector complementary to the first binary vector, where 1 or 0 in the first binary vector is switched to 0 and 1, respectively, in the second binary vector.

* * * * *